United States Patent
Yeap et al.

(10) Patent No.: US 11,294,988 B2
(45) Date of Patent: *Apr. 5, 2022

(54) METHOD AND SYSTEM FOR CONTROLLING MEDIA CONVEYANCE BY A DEVICE TO A USER BASED ON CURRENT LOCATION OF THE DEVICE

(71) Applicant: BCE INC., Verdun (CA)

(72) Inventors: Tet Hin Yeap, Ottawa (CA); Patrick Neilly, Mount Albert (CA)

(73) Assignee: BCE Inc., Verdun (CA)

( * ) Notice: Subject to any disclaimer, the term of this patent is extended or adjusted under 35 U.S.C. 154(b) by 82 days.

This patent is subject to a terminal disclaimer.

(21) Appl. No.: 15/584,853

(22) Filed: May 2, 2017

(65) Prior Publication Data

US 2017/0235927 A1   Aug. 17, 2017

Related U.S. Application Data

(63) Continuation of application No. 13/387,924, filed as application No. PCT/CA2009/001084 on Jul. 31, 2009, now Pat. No. 9,641,889.

(51) Int. Cl.
*H04N 21/45* (2011.01)
*H04N 21/431* (2011.01)
(Continued)

(52) U.S. Cl.
CPC ........ *G06F 21/10* (2013.01); *G11B 20/00086* (2013.01); *G11B 20/00739* (2013.01);
(Continued)

(58) Field of Classification Search
CPC ......... H04N 21/42202; H04N 21/6547; H04N 21/4524; H04N 21/4318; H04N 21/23892; H04N 21/8358
See application file for complete search history.

(56) References Cited

U.S. PATENT DOCUMENTS 6,108,365 A * 8/2000 Rubin .................. G01S 19/14
340/5.2
6,182,218 B1 * 1/2001 Saito .................... G06F 21/10
348/E7.056
(Continued)

OTHER PUBLICATIONS

Official Action from Canadian Patent Application No. 2,769,586 dated Oct. 25, 2018.

*Primary Examiner* — Pinkal R Chokshi
(74) *Attorney, Agent, or Firm* — Gowling WLG (Canada) LLP

(57) ABSTRACT

A method for execution by a customer premises receiver, comprising: receiving a signal that carries an original media stream; determining a location of the receiver; obtaining an identifier of an authorized region for the receiver; determining whether said location is contained within said authorized region; if said location is determined to be contained within said authorized region, outputting the original media stream for conveyance to a user; if said location is determined to not be contained within said authorized region, outputting a second media stream that is sufficiently corrupted relative to the original media stream as to degrade the user's viewing experience while being demonstrative of non-malfunctioning of the receiver. Also, a method, comprising a service provider releasing towards a plurality of customer premises receivers information regarding a respective geographic region within which each receiver is authorized to operate, wherein different geographic regions define coverage areas of different sizes.

20 Claims, 14 Drawing Sheets

(51) Int. Cl.

| | |
|---|---|
| *H04N 21/2389* | (2011.01) |
| *H04N 21/8358* | (2011.01) |
| *G06F 21/10* | (2013.01) |
| *G11B 20/00* | (2006.01) |
| *H04N 21/4405* | (2011.01) |
| *H04N 21/4627* | (2011.01) |
| *H04N 5/913* | (2006.01) |
| *H04N 21/61* | (2011.01) |
| *H04N 21/2347* | (2011.01) |
| *H04N 21/418* | (2011.01) |
| *H04L 9/08* | (2006.01) |

(52) U.S. Cl.
CPC .. *G11B 20/00818* (2013.01); *G11B 20/00884* (2013.01); *H04L 9/0872* (2013.01); *H04L 9/0877* (2013.01); *H04N 5/913* (2013.01); *H04N 21/2347* (2013.01); *H04N 21/23892* (2013.01); *H04N 21/4181* (2013.01); *H04N 21/4318* (2013.01); *H04N 21/4405* (2013.01); *H04N 21/4524* (2013.01); *H04N 21/4627* (2013.01); *H04N 21/6143* (2013.01); *H04N 21/8358* (2013.01); *G06F 2221/0708* (2013.01); *H04N 2005/91335* (2013.01)

(56) References Cited

U.S. PATENT DOCUMENTS

| | | | |
|---|---|---|---|
| 6,347,216 B1* | 2/2002 | Marko | H04B 7/18567 455/12.1 |
| 6,768,980 B1* | 7/2004 | Meyer | G06T 1/0021 382/248 |
| 8,166,505 B2* | 4/2012 | Kim | H04N 5/4401 725/62 |
| 2003/0149891 A1* | 8/2003 | Thomsen | H04L 63/1466 726/13 |
| 2006/0212892 A1* | 9/2006 | Hunter | H04N 5/913 725/1 |
| 2008/0130944 A1* | 6/2008 | Johnson | G06T 1/0021 382/100 |
| 2009/0150676 A1 | 6/2009 | Chen et al. | |
| 2009/0193450 A1* | 7/2009 | Kellerman | H04N 7/165 725/25 |
| 2010/0188583 A1* | 7/2010 | Neuman | H04N 9/646 348/607 |
| 2012/0328149 A1* | 12/2012 | Chen | G06T 1/0021 382/100 |

* cited by examiner

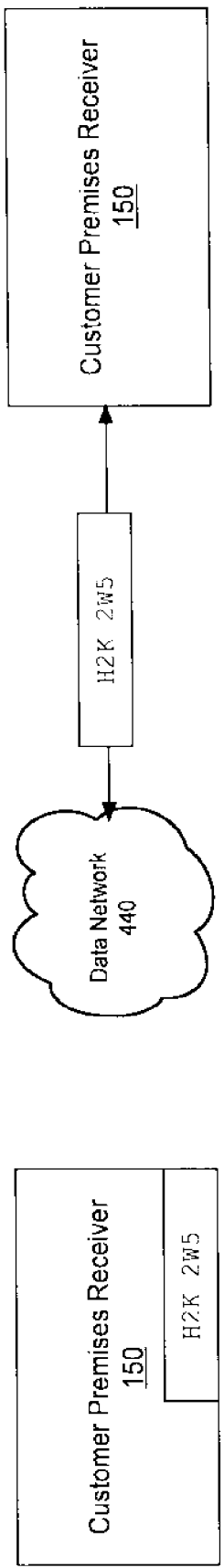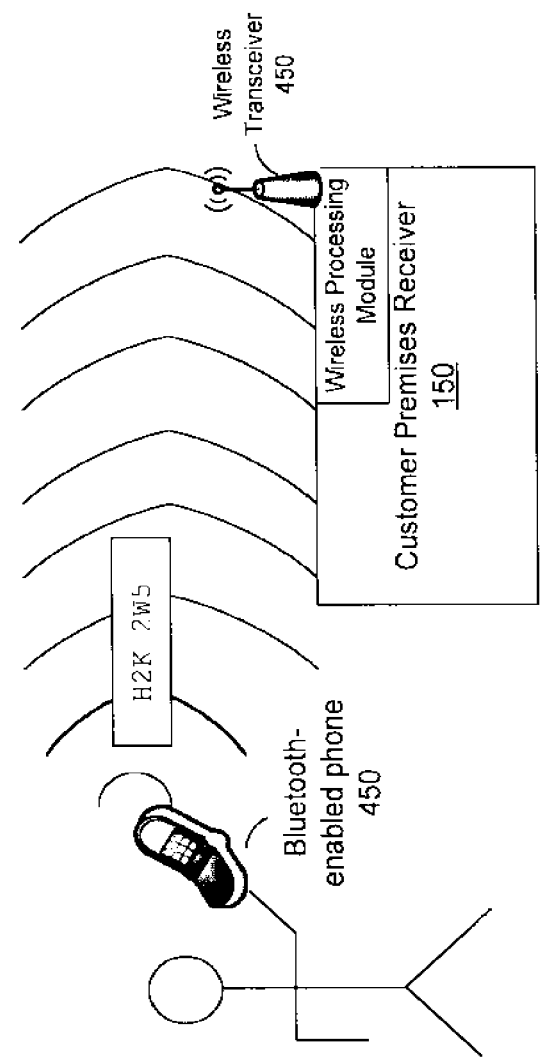

METHOD AND SYSTEM FOR CONTROLLING MEDIA CONVEYANCE BY A DEVICE TO A USER BASED ON CURRENT LOCATION OF THE DEVICE

RELATED APPLICATIONS

The current application is a Continuation of U.S. patent application Ser. No. 13/387,924, filed Jan. 30, 2012, which is a National Phase entry of International Application No. PCT/CA2009/001084, filed Jul. 31, 2009, both of which are incorporated by reference herein in their entirety.

FIELD OF THE INVENTION

The present invention pertains generally to the distribution of media to customer devices and, in particular, to a method and system for controlling media conveyance by a customer premises receiver to a user based on a location of the customer premises receiver.

BACKGROUND

Satellite distribution systems are a cost-effective way for service providers to deliver television services and other media to potential viewers in a large geographic area. The service provider beams a signal from a distribution center towards a satellite, and the satellite beams the signal back to Earth, in an area referred to as a "footprint". From the customer end, a customer subscribes to a service package, obtains a receiver and a satellite dish, directs the dish in the general area of the satellite and can begin enjoying programming associated with the package.

From a service provider's perspective, one of the main drawbacks of satellite distribution system is that the signal is rendered available to everyone within the area of the satellite "footprint", regardless of whether those individuals are paying customers or not. Thus, it is possible (with the right equipment) for a non-subscriber to capture the signal and therefore enjoy media programming (such as TV shows) as if he or she were a subscriber. This is referred to in the industry as satellite signal piracy.

To this end, service providers have implemented security measures that limit the unauthorized viewing of television channels. For example, the signal may be encrypted in such a way that it can only be decrypted by a hardware device that includes the appropriate decryption key. Such a decryption key can be installed in each authorized receiver. A limited number of receivers are then available for distribution to each customer, for an incremental fee, to allow enjoyment in multiple areas of the home, for example.

However, even with such limitations in place, service providers are still vulnerable to satellite signal piracy. In fact, certain unscrupulous customers have been known to request the maximal number of receivers and then to rent out the individual receivers to non-customers anywhere within the "footprint" who desire satellite reception at a reduced cost and require only a single receiver. The unscrupulous customer thus becomes an underground reseller of programming available with the package to which he himself subscribes. The reason that this is economically feasible is that the total cost of the reseller's subscription, including the maximum number of receivers, which is then divided by the number of receivers (i.e., the number of non-customers who are potential customers of the reseller), is less than what it would have otherwise cost each non-customer to become a legitimate customer with access to a single receiver.

Against this background, it is clear that a need exists in the industry to curb the activities of underground resellers in order to preserve the economic viability of satellite distribution as an alternative to cable and other forms of television and other media delivery to consumers.

SUMMARY OF THE INVENTION

According to a first broad aspect, the present invention seeks to provide a method for execution by a customer premises receiver, comprising: the customer premises receiver receiving a received signal that carries an original media stream; the customer premises receiver determining a current location of the customer premises receiver; the customer premises receiver obtaining an identifier of an authorized geographic region for the customer premises receiver; the customer premises receiver determining whether said current location is contained within said authorized geographic region; if said current location is determined to be contained within said authorized geographic region, the customer premises receiver outputting the original media stream for conveyance to a user; if said current location is determined to not be contained within said authorized geographic region, the customer premises receiver outputting a second media stream that is sufficiently corrupted relative to the original media stream as to degrade the user's viewing experience while being demonstrative of non-malfunctioning of the customer premises receiver.

According to a second broad aspect, the present invention seeks to provide a customer premises receiver, comprising: an input configured to receive a received signal carrying an original media stream; a location determining entity configured to determine a current location of the customer premises receiver; a location comparing entity operatively coupled to the location determining entity and configured to obtain an indication of an authorized geographic region for the customer premises receiver and to determine whether said current location is contained within said authorized geographic region; and an output configured to (i) output the customer premises receiver outputting the original media stream for conveyance to a user, if said current location is determined to be contained within said authorized geographic region and (ii) a second media stream that is sufficiently corrupted relative to the original media stream as to degrade the user's viewing experience while being demonstrative of non-malfunctioning of the customer premises receiver, if said current location is determined to not be contained within said authorized geographic region.

According to a third broad aspect, the present invention seeks to provide a computer-readable storage medium comprising a set of instructions for execution by a computing device at a customer premises receiver, wherein execution of the set of instructions by the computing device causes the customer premises receiver to execute a method that includes: receiving a received signal that carries an original media stream; determining a current location of the customer premises receiver; obtaining an identifier of an authorized geographic region for the customer premises receiver; determining whether said current location is contained within said authorized geographic region; if said current location is determined to be contained within said authorized geographic region, outputting the original media stream for conveyance to a user; and if said current location is determined to not be contained within said authorized geographic region, outputting a second media stream that is sufficiently corrupted relative to the original media stream as to degrade the user's viewing experience while being demonstrative of non-malfunctioning of the customer premises receiver.

According to a fourth broad aspect, the present invention seeks to provide an apparatus, comprising: a memory storing a plurality of customer premises receiver identifiers in association with respective authorized geographic region identifiers, the customer premises receiver identifiers identifying individual customer premises receivers, the authorized geographic region identifiers defining respective coverage areas of different sizes in which the respective customer premises receivers are authorized to operate; a processing entity configured to consult said memory based on a particular one of the customer premises receiver identifiers in order to identify a particular one of said authorized geographic region identifiers that is associated with said particular one of the customer premises receiver identifiers; and an output configured to cause said particular one of said authorized geographic region identifiers to be released towards the individual customer premises receiver identified by said particular one of the customer premises identifier receivers.

According to a fifth broad aspect, the present invention seeks to provide a method, comprising a service provider releasing towards a plurality of customer premises receivers information regarding a respective geographic region within which each customer premises receiver is authorized to operate, wherein the geographic regions in which different ones of the customer premises receivers are authorized to operate define coverage areas of different sizes.

According to a sixth broad aspect, the present invention seeks to provide a computer-readable storage medium comprising a set of instructions for execution by a computing device at a head end, wherein execution of the set of instructions by the computing device causes the computing device to execute a method that includes releasing towards a plurality of customer premises receivers information regarding a respective geographic region within which each customer premises receiver is authorized to operate, wherein the geographic regions in which different ones of the customer premises receivers are authorized to operate define coverage areas of different sizes.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

In the accompanying drawings:

FIGS. 4A through 4F show various ways in which the customer premises receiver can be informed of its authorized geographic region, in accordance with specific non-limiting embodiments of the present invention;

It is to be expressly understood that the description and drawings are only for the purpose of illustration of certain embodiments of the invention and are an aid for understanding. They are not intended to be a definition of the limits of the invention.

DETAILED DESCRIPTION

Figure 1:
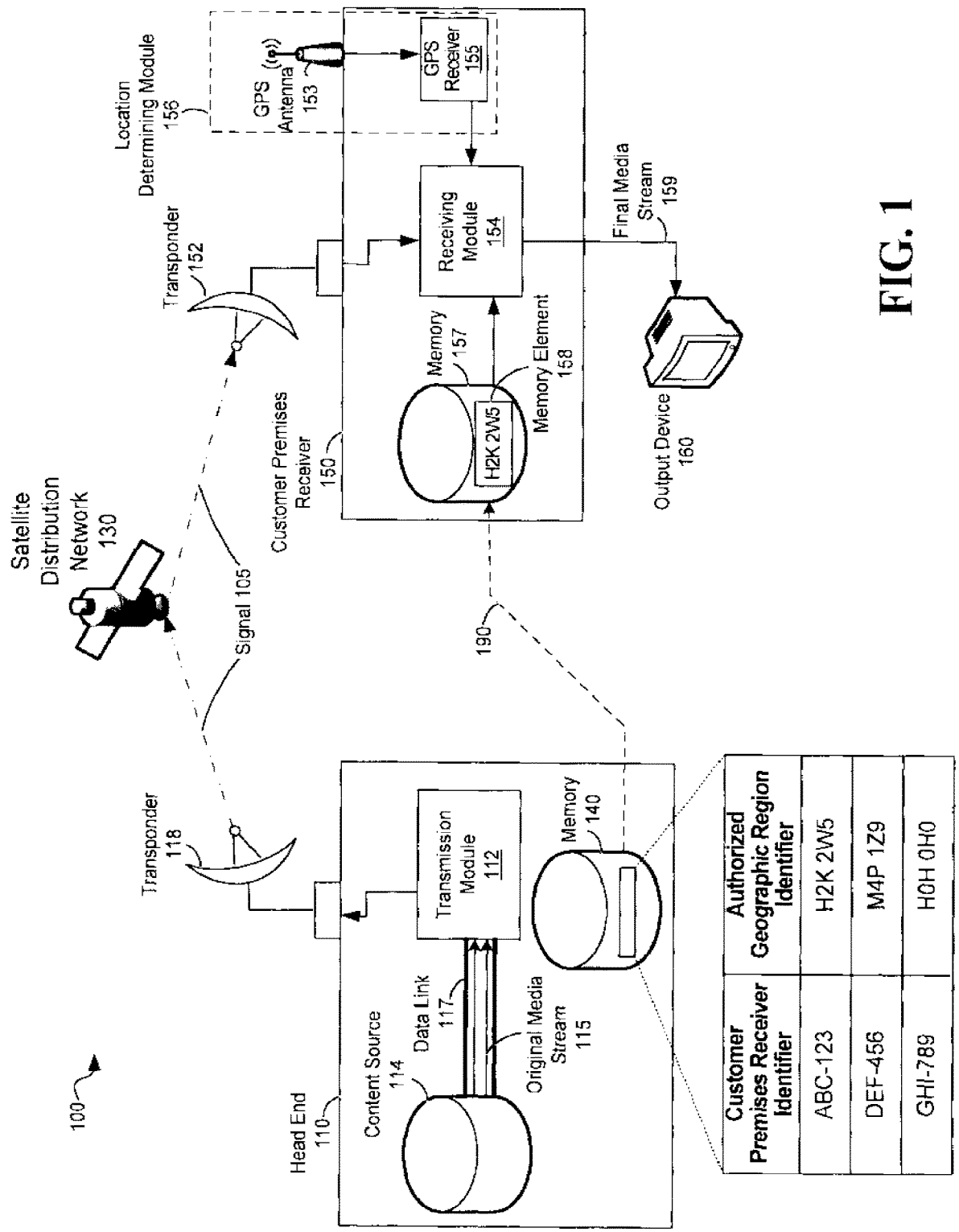
FIG. 1 is a block diagram of a media distribution for distributing media from a head end to a customer premises receiver, in accordance with a specific non-limiting embodiment of the present invention.

With reference to FIG. 1, there is shown a media distribution system 100 for distributing media from a head end 110 to a plurality of customer premises receivers, in accordance with a specific non-limiting embodiment of the present invention. The head end 110 includes a transmission module 112 and has access to a content source 114, which provides media streams, including an original media stream 115, to the transmission module 112. The media streams, including the original media stream 115, may be video streams, audio streams, a mix of audio and video and streams, as well as any other type of media stream. In a specific non-limiting example, the original media stream 115 may be an MPEG-2 stream, which is a data stream carrying video and audio encoded in accordance with the MPEG-2 standard. Naturally, other possibilities exist and are within the scope of the present invention.

The content source 114 may be local to the head end 110 or it may be external to the head end 110 and connected thereto by a data link 117. In some embodiments, the data link 117 may traverse a data network, such as the Internet. In some embodiments, the content source 114 can provide live action media streams, while in other embodiments, the content source 114 can provide pre-recorded media streams. In yet other embodiments, the content source 114 may provide computer-generated content streams, to name a few non-limiting possibilities. Other content sources (not shown) may exist and may provide additional content streams to the transmission module 112.

Figure 2A:
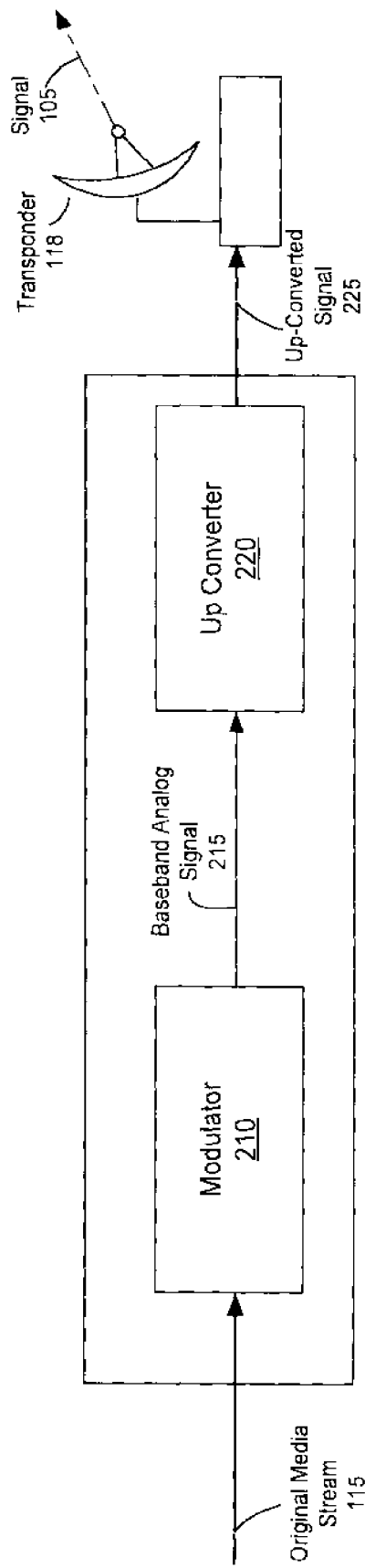
FIG. 2A is a block diagram illustrating entities participating in the transformation of an original media stream into a signal that is ready for transmission, in accordance with a specific non-limiting embodiment of the present invention.

The transmission module 112 produces a signal destined for the plurality of customer premises receivers, including a customer premises receiver 150. In accordance with a specific non-limiting embodiment of the present invention, and as shown in FIG. 2A, the transmission module 112 may comprise a modulator 210 that takes the original media stream 115, which can be digital, and modulates it to create a baseband analog signal 215. The transmission module 112 may also comprise an up-converter 220 that translates the baseband analog signal into a satellite frequency band, thereby creating an up-converted signal 225.

Returning now to FIG. 1, the up-converted signal 225 passes through a transponder 118, such as a satellite dish or antenna, for example, and is released from the head end 110 in the form of a signal 105. For example, the signal 105 can be beamed towards one or more geo-stationary satellites forming part of a satellite distribution network 130. The satellite distribution network 130 is responsible for relaying the signal 105 back to Earth. The satellite distribution network 130 may thus be able to reach users within a wide footprint area, such as a large portion of the North American continent. As a result, customer premises receivers within this footprint—such as customer premises receiver 150—may be able to receive the signal 105.

It should be appreciated that other forms of signal distribution are possible, including terrestrial wireless, terrestrial non-wireless and hybrid implementations. An example of a terrestrial non-wireless implementation is a cable distribution system, whereby the signal 105 would be distributed via an arrangement of coaxial cable links out towards individual ones of the customer premises receivers. Other implementations may use fiber optic cables, microwave antennas, free-space optics and so on. Still other possibilities exist and are within the scope of the present invention, and those skilled in the art will be capable of making the necessary adjustments to the equipment used at the transmission module 112 for compatibility with the chosen form of signal distribution.

Figure 2B:
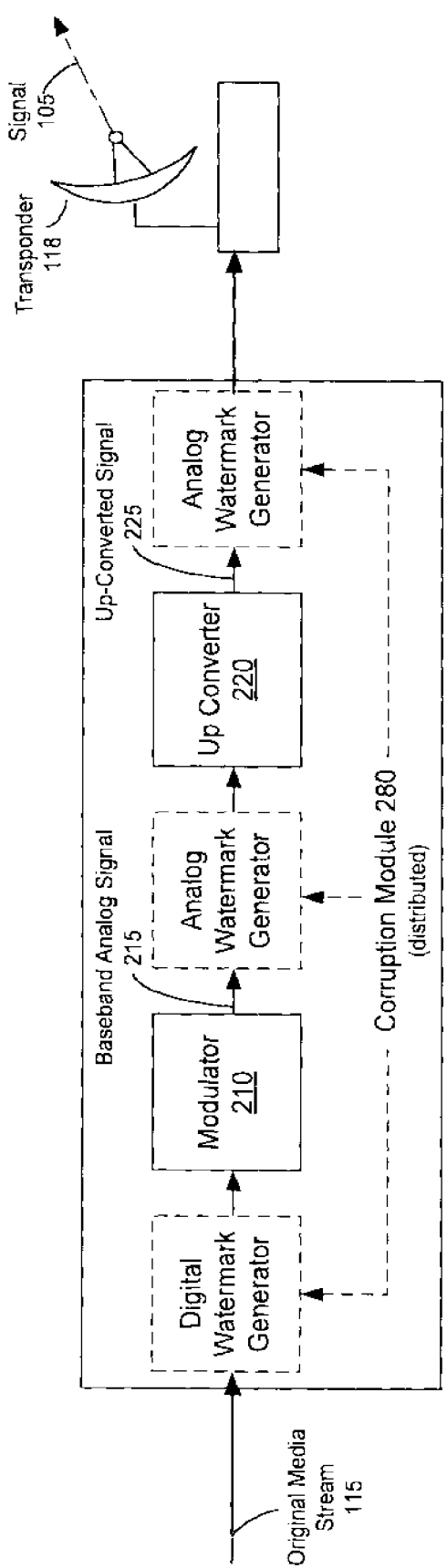
FIG. 2B is a block diagram illustrating the entities of FIG. 2A enhanced with a corruption module, in accordance with a specific non-limiting embodiment of the present invention.

Referring now to FIG. 2B, the transmission module 112 can also include a corruption module 280, which is optional. If used, this module causes a manifestation of corruption in the signal 105. In order to cause a manifestation of corruption in the signal 105, the integrity of the original media stream 115 or of the signal 105 itself can be impaired. In accordance with a specific non-limiting embodiment of the present invention, the integrity of the signal 105 can be impaired by applying an analog watermark (or other artifact) to the up-converted signal 225 using an analog watermark generator or similar device. In accordance with another specific non-limiting embodiment of the present invention, the integrity of the signal 105 can be impaired by applying an analog watermark (or other artifact) to the baseband analog signal 215 prior to processing by the up-converter 220. In both of the aforementioned examples, the original media stream 115 is left intact. In accordance with yet another specific non-limiting embodiment of the present invention in which the integrity of the original media stream 115 can be impaired, this can be done by manipulating the original media stream 115 (e.g., by applying a digital watermark (or other artifact) to an MPEG-2 stream using a digital watermark generator or similar device) prior to processing by the modulator 210. A combined approach is also possible, whereby in addition to applying a digital watermark (or other artifact) to the original media stream 115, an analog watermark (or other artifact) can be applied to the baseband signal 215 and/or to the up-converted signal 225. Yet other possibilities for causing a manifestation of corruption in the signal 105 exist and are within the scope of the present invention.

In accordance with a specific non-limiting embodiment of the present invention, individual customer premises receivers are authorized to operate only in specific "authorized" geographic regions. For example, the terms of a service agreement between a service provider (who is responsible for issuing the signal 105 towards the customer premises receivers) and individual customers (with service provider accounts to which individual customer premises receivers are registered) may define specific geographic regions in which the individual customer premises receivers are allowed to operate.

The specific geographic regions in which the individual customer premises receivers are allowed to operate may have a fixed or variable size (coverage area) and/or configuration (shape).

Figure 9:
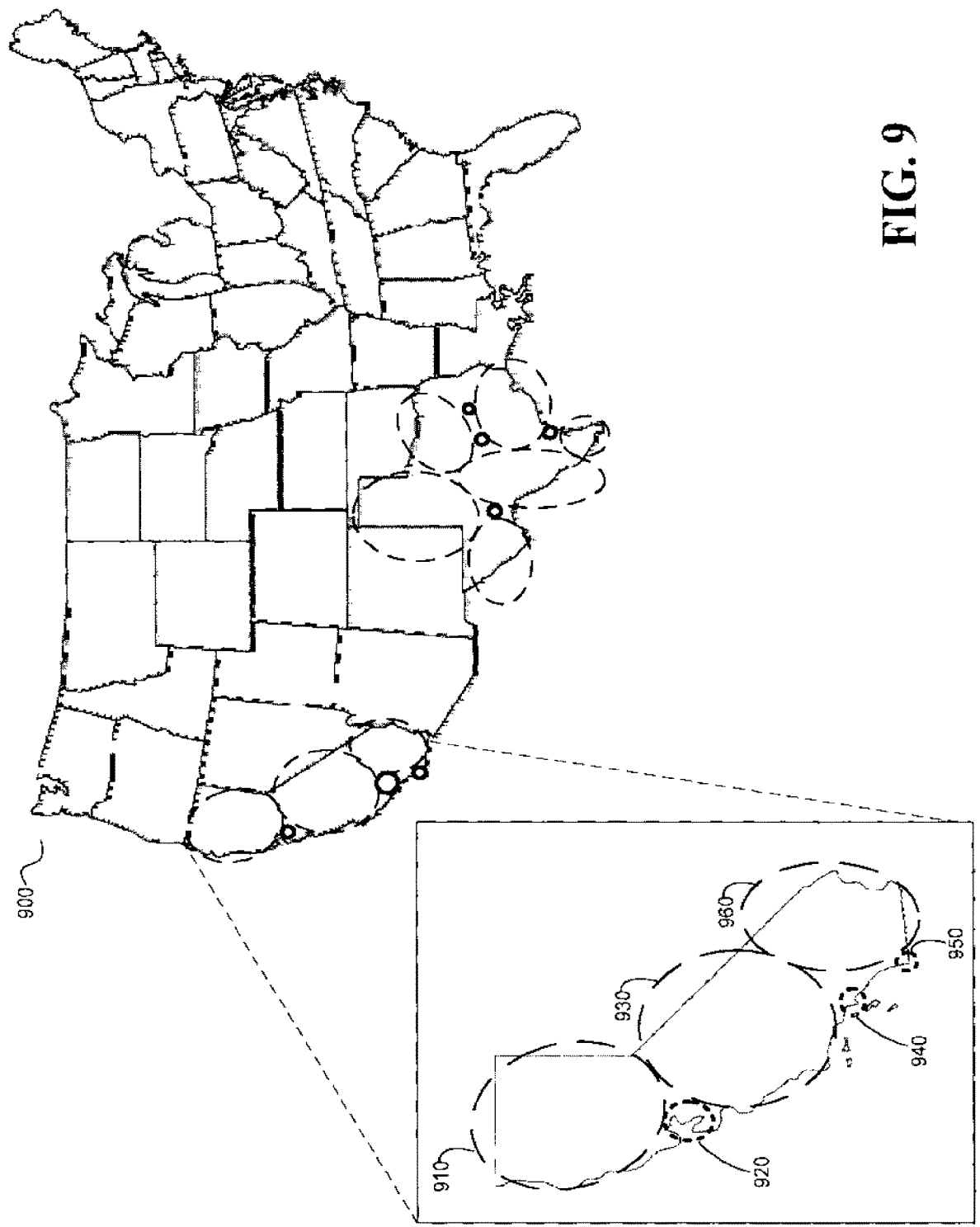
FIG. 9 illustrates a variability in the size of individual authorized geographic region within a larger coverage area.

In terms of size of the authorized geographic regions, it may be fixed or it may be variable. If it is variable, then the size of a particular authorized geographic region may depend on where, within a larger coverage area, the particular authorized geographic region is actually located. A non-limiting example of a factor that can be made to have an effect on the size of individual authorized geographic regions is population density. For example, FIG. 9 shows a map 900 of the United States displaying several authorized geographic regions of variable sizes within the states of California and Texas. Generally speaking, in this approach, a first authorized geographic region situated in an area of relatively high population density may be smaller in size (i.e., square kilometer coverage) than a second authorized geographic region situated in an area of relatively low population density. This allows the service provider to impose increasingly stricter limits on the mobility of a particular customer premises receiver as the population density around that customer premises receiver increases. One practical effect is that, in general, property owners with larger properties will have the freedom to install their receivers anywhere on their respective properties while remaining within their respective authorized geographic regions.

For example, the callout in FIG. 9 shows that there are six (6) authorized geographic regions within a hypothetical satellite footprint area covering state of California, namely areas 910 to 960. For the sake of simplicity, the size of each authorized geographic region varies by population density, which in this case, is divided between densely populated urban areas and less densely populated rural areas. Thus, the relatively larger authorized geographic regions 910, 930 and 960 represent the less densely populated rural areas in the north, central and southern portions of the state, respectively. In contrast, the relatively smaller authorized geographic regions 920, 940 and 950 represent the more densely populated urban areas of San Francisco (region 920), Los Angeles (region 940) and San Diego (region 950). As for the configuration of the authorized geographic regions, it may be fixed (e.g., circular, according to the sweeping path of a radius emanating from a center point of the authorized geographic region) or it may be variable. If it is variable, then the variability of the configuration from one authorized geographic region to another may be based on a natural topography model (e.g., limited by physical boundaries such as rivers, coastlines and mountain ranges), a political model (e.g., follows state/provincial or international boundaries), an urban planning model (e.g., limited by buildings, roads, etc.), an established service delivery model (e.g., follows the boundaries already defined by zip or postal codes) as well as other models or combinations of the above.

In a specific non-limiting example where the configuration of the authorized geographic regions is fixed, consider that each customer premises receiver is registered to a respective customer who provides a street address. The authorized geographic region for each customer premises receiver may cover an area that surrounds the street address of the respective customer, e.g., in the form of a box, circle, ellipse having a pre-defined shape.

In a specific non-limiting example where the configuration of the authorized geographic regions is fixed, consider that each customer premises receiver is registered to a respective customer who provides an address that includes a zip or postal code. The authorized geographic region for each customer premises receiver may cover an area that follows the boundaries already defined by the zip or postal code in the address of the respective customer.

For example, and with reference to FIG. 9, the configurations of the authorized geographic regions 910 to 960 are generally elliptical (in the case of the relatively larger authorized geographic regions 910, 930 and 960) or generally circular, such as for the relatively smaller authorized geographic regions 920, 940 and 950. In practice, however, it is likely that the authorized geographic regions for a densely populated urban area such as Los Angeles would be polygonal in nature (e.g., square or rectangular). Such an approach would allow each authorized geographic region to correspond to a particular neighborhood (e.g., West Hollywood, Beverley Hills, Inglewood, etc.) or zip/postal code (e.g., 90210, etc.), so preventing users in one particular neighborhood or zip code area from using their receivers outside of the boundaries of this area.

Naturally, size and configuration are closely related characteristics. Thus, where the configuration of different authorized geographic regions varies, this may have an impact on their size.

The head end 110 further has access to a memory 140, which stores an association between identifiers of individual customer premises receivers (hereinafter "customer premises receivers identifiers") and respective identifiers of authorized geographic regions (hereinafter "authorized geographic region identifiers"). The memory 140 may be local to the head end 110 or it may be external to the head end 110 and connected thereto by a data link (not shown). In some embodiments, this data link may traverse a data network, such as the Internet. For convenience, but without limiting the present invention, the association stored in the memory 140 may be represented as a table. The customer premises receiver identifiers stored in the table each identify a respective one of the customer premises receivers, while the authorized geographic region identifiers stored in association with respective customer premises receiver identifiers each identify the authorized geographic region for the customer premises receiver identified by the respective customer premises receiver identifier.

For example, and with reference to FIG. 1, the table stored within the memory 140 includes (among others) three (3) entries for the customer premises receivers identified with the customer premises receiver identifiers ABC-123, DEF-456 and GHI-789. These three receivers are associated with the authorized geographic regions H2K 2W5, M4P 1Z9 and H0H0H0, respectively.

In an example non-limiting embodiment, the customer premises receiver identifier that identifies a particular customer premises receiver can be a serial number, MAC address or other information uniquely associated with the particular customer premises receiver. It is assumed for the sake of illustration that customer premises receiver identifier ABC-123 identifies customer premises receiver 150. Thus, in the specific illustrated non-limiting embodiment where the table comprises customer premises receiver identifier ABC-123, it will be clear that this represents customer premises receiver 150. Also apparent from the table is that customer premises receiver identifier ABC-123 is associated with authorized geographic region identifier H2K 2W5, which means that customer premises receiver 150 is only authorized to operate in the geographic region represented by authorized geographic region identifier H2K 2W5.

The manner in which a particular authorized geographic region is represented through its authorized geographic region identifier is not particularly limited. In one specific non-limiting embodiment, the particular authorized geographic region can be identified by a range of authorized latitude/longitude coordinates. In another specific non-limiting embodiment, the particular authorized geographic region can be identified by an interior point (e.g., in terms of latitude/longitude) and a set of distances in corresponding directions (e.g., north, south, east and west) branching out from the interior point. In another specific non-limiting embodiment, the particular authorized geographic region can be identified by a set of latitude/longitude coordinates that define its outer boundary. In yet another specific non-limiting embodiment, the particular authorized geographic region can be identified by a zip or postal code. Still other formats such as customized codes could be used without departing from the scope of the present invention.

For the sake of illustration, authorized geographic region identifier H2K 2W5 has been configured to represent a Canadian postal code. Thus, in the specific illustrated non-limiting embodiment where the table comprises authorized geographic region identifier H2K 2W5, one will understand that customer premises receiver 150 (which is represented by customer premises receiver identifier ABC-123) is only authorized to operate within the authorized geographic region defined by the geographic limits of postal code H2K 2W5.

With continued reference to FIG. 1, customer premises receiver 150 will now be described. Customer premises receiver 150 comprises a transponder 152 (such a satellite dish or an antenna, for example) and a receiving module 154. The transponder 152 receives the signal 105, and converts it into a high-frequency signal, which is then provided to the receiving module 154. The receiving module 154 then performs various operations on the high-frequency signal to ultimately produce a final media stream 159 for conveyance to a user via an output device 160 such as a television, set-top box, computer, gaming device, and so on.

More specifically, and in accordance with a specific non-limiting embodiment of the present invention, the final media stream 159 that is conveyed to the user may acquire one of two forms. A first (clean) form of the final media stream 159 is one in which the final media stream 159 matches the original media stream 115. This form of the final media stream 159 is conveyed when customer premises receiver 150 is authorized to operate from its current location. A second (corrupted) form of the final media signal 159 is one in which the final media stream 159 is sufficiently corrupted relative to the original media stream 115 as to degrade the user's viewing experience while being demonstrative of non-malfunctioning of customer premises receiver 150. This form of the final media stream is conveyed when customer premises receiver 150 is not authorized to operate from its current location.

The receiving module 154 is configured with the hardware, software, firmware and/or control logic necessary to allow the final media stream 159 to acquire its two forms. The configuration of the receiving module 154 in this respect depends to a certain extent on whether the head end 110 implements the aforesaid corruption module 280.

For example, where the head end 110 implements the aforementioned corruption module 280 (see FIG. 2B), then the signal 105 received by customer premises receiver 150 already contains some form of corruption applied to the original media stream 115. As a result, the receiving module 154 does not require specialized functionality to allow the final media stream 159 to acquire the second (corrupted) form. However, in order to allow the final media stream 159 to acquire the first (clean) form, the receiving module 154 will likely include a means of correction in order to remove the manifestation of corruption in the signal 105 that was induced by the corruption module 280 at the head end 110.

Figure 3A:
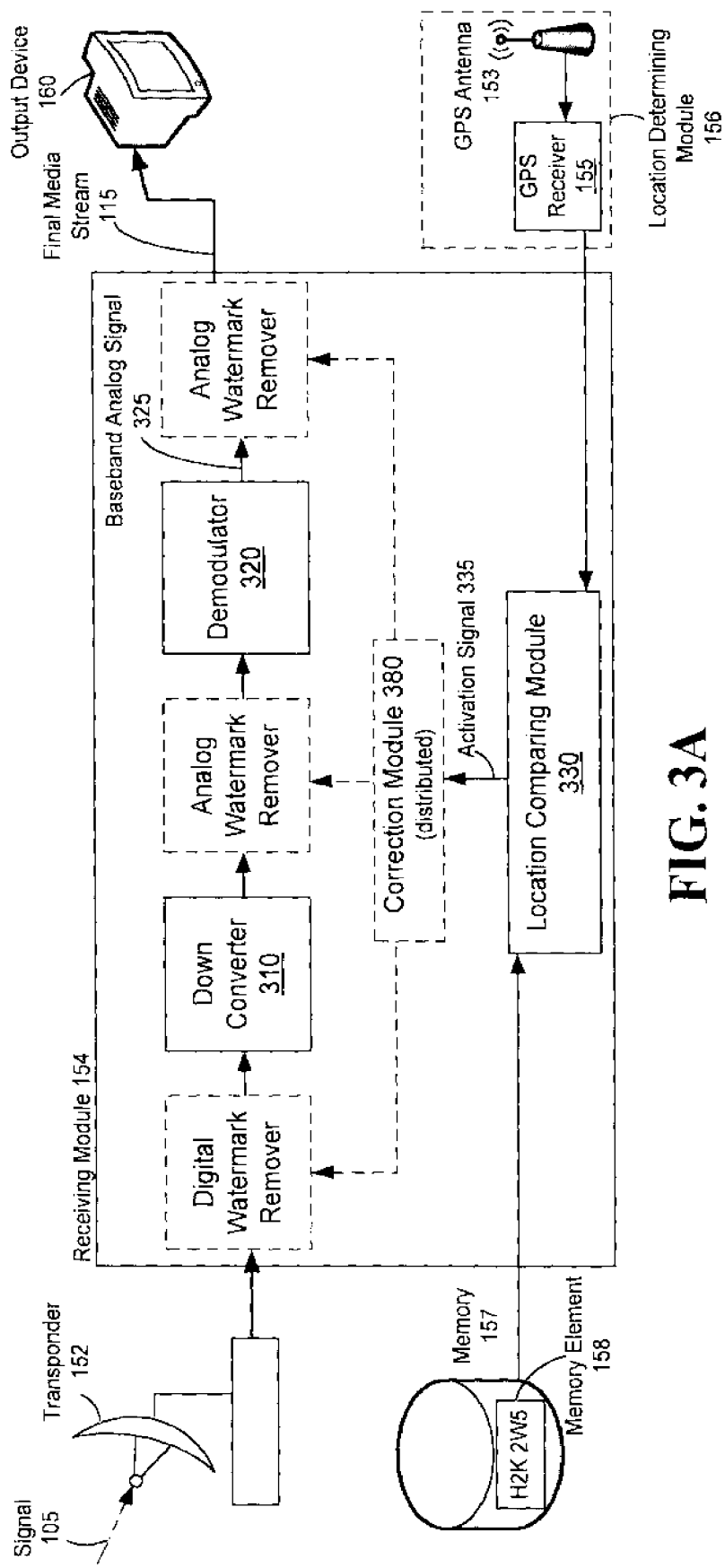
FIG. 3A is a block diagram illustrating entities, including a correction module, that participate in the transformation of a received signal into a final media stream that is ready for conveyance to a user, in accordance with a specific non-limiting embodiment of the present invention.

To this end, and with reference to FIG. 3A, the receiving module 154 may comprise a down-converter 310 for translating the high-frequency signal from a satellite frequency band into baseband, thereby to produce a baseband analog signal 325. A demodulator 320 can also be provided to extract the final media stream 159 from the baseband analog signal 325. A correction module 380, which can be controllably activated or deactivated via an activation signal 335, is distributed at one or more key points along the signal path. Thus, the correction module 380 can process the high-frequency signal and/or the baseband signal through an analog watermark remover (or similar device) in order to remove analog watermark(s) (or other artifact(s)) that may have been applied thereto by the corruption module 280 at the head end 110. Alternatively or in addition, the correction module can process the output of the demodulator 320 media stream though a digital watermark remover (or similar device) to remove a digital watermark (or other artifact) that may have been applied by the corruption module 280 at the head end 110.

Thus, if the correction module 380 is activated, the final media stream 159 is conveyed in its "clean" form and if the correction module 380 is not activated, the final media stream 159 is conveyed in its "corrupted" form (where "cleanliness" is relative to the original media stream 115). Activation of the correction module 380 depends on an output of a location comparing module 330, which will be described later on.

On the other hand, where the head end 110 does not implement the aforementioned corruption module 280 (see FIG. 2A), then the signal 105 received by customer premises receiver 150 is uncorrupted, and so the receiving module 154 does not require specialized functionality to allow the final media stream 159 to acquire the first (clean) form. However, in order to allow the final media stream 159 to acquire the second (corrupted) form, the receiving module 154 will require some means of adding corruption in order to degrade the user's viewing experience.

Figure 3B:
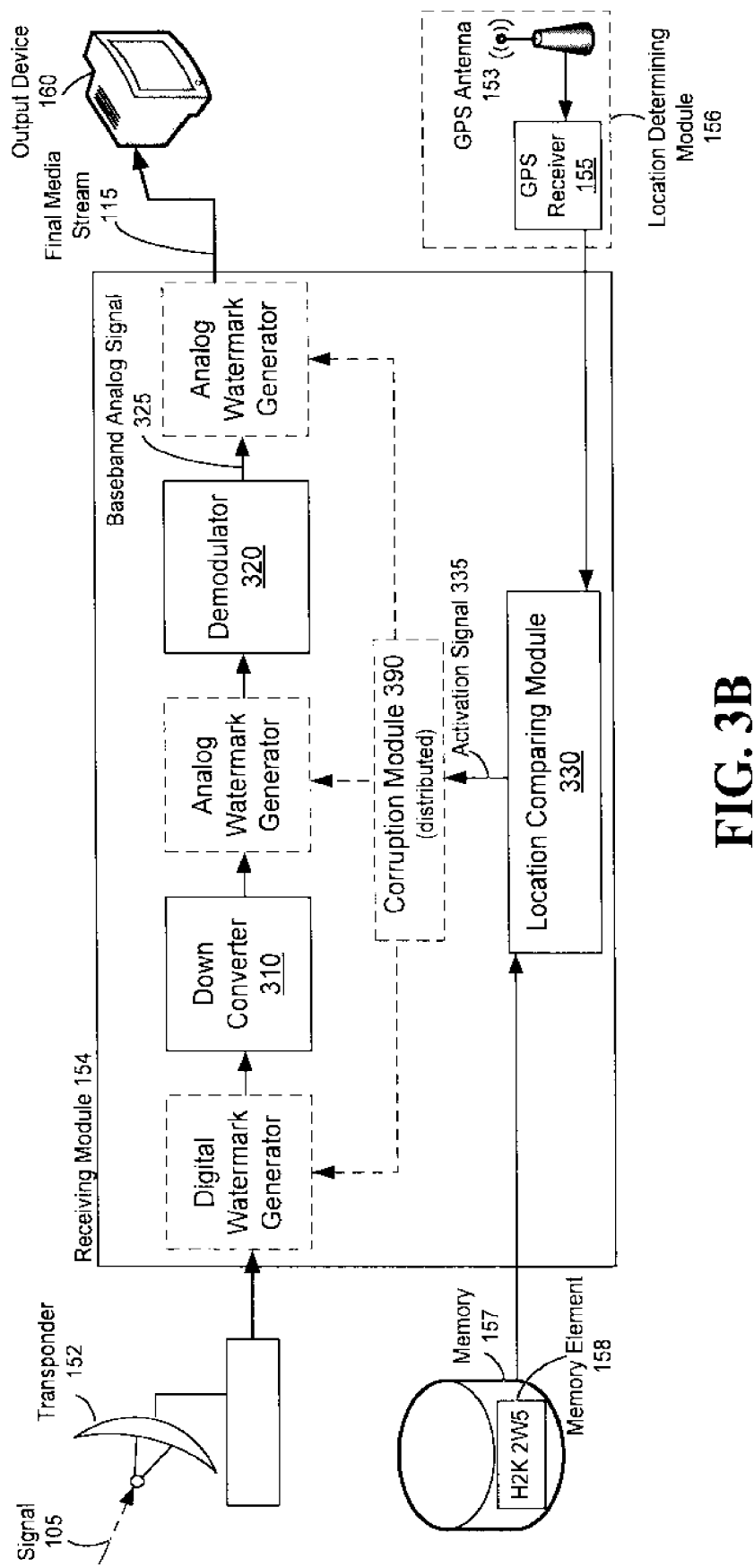
FIG. 3B is a block diagram illustrating entities, including a corruption module, that participate in the transformation of a received signal into a final media stream that is ready for conveyance to a user, in accordance with a specific non-limiting embodiment of the present invention.

To this end, and with reference to FIG. 3B, the receiving module 154 may comprise the aforementioned down-converter 310 for translating the high-frequency signal from a satellite frequency band into baseband, thereby to produce the baseband analog signal 325. The aforementioned demodulator 320 can also be provided to extract the final media stream 159 from the baseband analog signal 225. A corruption module 390, which can be controllably activated or deactivated via an activation signal 335, is distributed at one or more key points along the signal path. Thus, the corruption module 390 may process the high-frequency signal and/or the baseband signal in order to add analog watermark(s) (or other artifact(s)) as desired. Alternatively or in addition, the corruption module 390 may process the output of the demodulator 320 to add a digital watermark (or other artifact) or to completely change the digital content of the final media stream 159.

Here, if the corruption module 390 is activated, the final media stream 159 is conveyed in its "corrupted" form, while if the corruption module 390 is not activated, the final media stream 159 is conveyed in its "clean" form (where "cleanliness" is again relative to the original media stream 115). Activation of the corruption module 390 depends on an output of the location comparing module 330, which will be described later.

Additionally, it is possible to envisage a scenario where a corruption module is used at the head and, and where both a correction module and a corruption module are used at customer premises receiver 150. This situation may arise where a first type of corruption is induced by the head end 110 and removed by the correction module 380 at the receiving module 154, and where it is desired that the receiving module 154 then induce corruption of a different nature to the final media stream 159. Thus, the correction module 380 would remain activated throughout, meanwhile if the corruption module 390 remains inactive, the final media stream 159 is conveyed in its "clean" form, whereas if the corruption module 390 is activated, the final media stream 159 is conveyed in its "corrupted" form. Activation of the correction module 380 again depends on an output of the location comparing module 330, which will now be described.

The location comparing module 330 has an ability to activate the correction module 380 and/or the corruption module 390 at customer premises receiver 150 (via the activation signal 335) in order to cause conveyance of the final media stream 159 in its clean form or its corrupted form. This can be achieved via the activation signal 335 provided at an output of the location comparing module 330. The location comparing module 330 is configured to produce an output that indicates whether customer premises receiver 150 is authorized to operate from its current location. To this end, the location comparing module 330 receives a current location of customer premises receiver 150 from a location determining module 156 and also receives an authorized geographic region identifier from a memory 157.

Specifically, the location determining module 156 is configured to determine the current location of customer premises receiver 150. To this end, the location determining module 156 may include a global positioning system (GPS) antenna 153 and a GPS receiver 155. As is well known in the art, in a GPS system, an array of geo-stationary satellites is used to emit GPS signals in a coordinated fashion. A GPS receiver (such as the GPS receiver 155) that is within range of three (3) or more of the satellites receives GPS signals from these satellites from which it can determine its current location, based on measured differences among the received GPS signals. Thus, the location determining module 156 can determine the current location of customer premises receiver 150. The current location of customer premises receiver 150 can be expressed in a variety of ways, including but not limited to a pair of coordinates indicative of latitude and longitude. The location determining module 156 provides the current location of customer premises receiver 150 to the aforementioned location comparing module 330.

The memory 157 comprises a memory element 158 that stores the authorized geographic region identifier that can be provided to the location comparing module 330. In the example being presently considered, and with reference to the table in the memory 140 at the head end 110, customer premises receiver identifier ABC-123 (which was previously assumed to be the identifier of customer premises receiver 150) has been associated with authorized geographic region identifier H2K 2W5. Thus, it will be appreciated that in the illustrated embodiment, the memory element 158 contains authorized geographic region identifier H2K 2W5, and it is this authorized geographic region identifier that is supplied to the aforementioned location comparing module 330.

Since control over the form that the final media stream 159 is to take is based on whether customer remises receiver 150 is within or outside its authorized geographic region, the memory element 158 needs to be populated with the authorized geographic region identifier of customer premises receiver 150, which is stored in the table of the memory 140 at the head end 110. More specifically, the table stores an association between customer premises receiver identifiers and authorized geographic region identifiers, where the authorized geographic region identifiers define respective coverage areas in which the customer premises receivers identified by those customer premises receiver identifiers are authorized to operate.

A processing entity at the head end is then configured to consult the table based on a given customer premises receiver identifier (in this case, ABC-123) in order to identify the associated one of the authorized geographic region identifiers (in this case, H2K 2W5). The processing entity then causes communication of the authorized geographic region identifier for customer premises receiver 150, in this case H2K 2W5, towards customer premises receiver 150. In the illustrated non-limiting embodiment, communication of the authorized geographic region identifier "H2K 2W5" from the head end 110 to the memory element 158 is shown by a dashed arrow 190 in FIG. 1. This communication can take on many forms depending on the implementation of customer premises receiver 150.

Figure 4A:
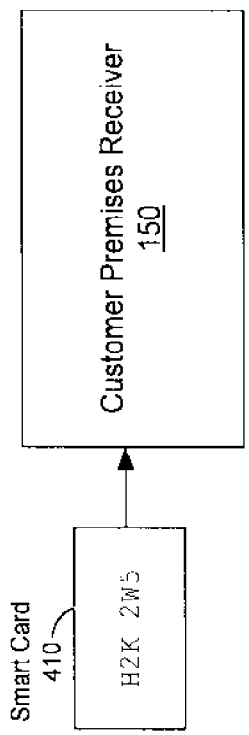

In a first specific non-limiting embodiment, shown in FIG. 4A, authorized geographic region identifier H2K 2W5 is stored on a smart card, such as a smart card 410. Customer premises receiver 150 is equipped with a smart card reader. When the smart card 410 is inserted into the smart card reader, the smart card reader reads authorized geographic region identifier H2K 2W5 and stores it in the memory element 158 of the memory 157 of customer premises receiver 150.

Figure 4B:
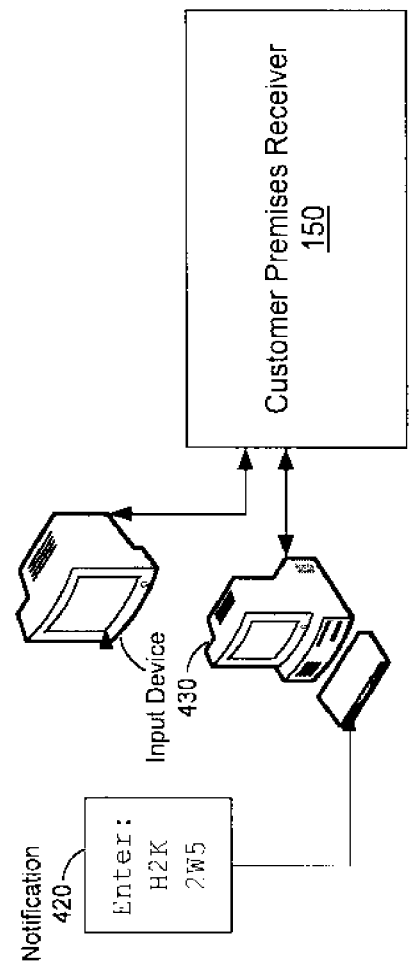

In a second specific non-limiting embodiment, shown in FIG. 4B, authorized geographic region identifier H2K 2W5 is provided to the user via some form of initial notification 420. Possible forms of initial notification 420 may include a telephone communication, an email communication, a regular mail communication and a fax communication, among others. Customer premises receiver 150 can be controlled from an input device 430 and interface that allows the user to input information (such as authorized geographic region identifier H2K 2W5) contained in the initial communication. In a non-limiting example, the input device 430 may comprise a TV remote control included with, or accessible to, customer premises receiver 150, which allows the user to enter the alphanumeric characters "H", "2", "K", "2", "W" and "5" provided via the initial notification 420 that indicate authorized geographic region identifier H2K 2W5. Alternatively, the input device 430 may comprise a wired or wireless connection apparatus, which allows a general purpose computer to be connected to customer premises receiver 150. In this case, the user could enter the alphanumeric characters via the input device of the general purpose computer (e.g., a keyboard), which would subsequently be transmitted to customer premises receiver 150 via a wired or wireless connection. Of course, other input devices and means of inputting information are possible and would fall within the scope of the present invention.

Regardless of the type of input device used as the input device 430, when the user inputs authorized geographic region identifier H2K 2W5, the input device and interface receives authorized geographic region identifier H2K 2W5 and stores it in the memory element 158 of the memory 157 of customer premises receiver 150.

In a third specific non-limiting embodiment, shown in FIG. 4C, the authorized geographic region identifier H2K 2W5 is pre-loaded into the memory 157 of customer premises receiver 150 before the latter is shipped or delivered to its location.

In a fourth specific non-limiting embodiment, shown in FIG. 4D, customer premises receiver 150 has a connection to a data network, such as the Internet, either via the same physical medium over which it receives the signal 100 or over a separate connection (such as a conventional telephone line, WiMax, cable, etc.). Customer premises receiver 150 implements a software application for communicating with other computers and entities over the Internet or other data network. Thus, when the software application contacts the head end 110 or another entity that securely maintains authorized geographic region identifier H2K 2W5 over the Internet, authorized geographic region identifier H2K 2W5 can be supplied over the Internet and the software application can store authorized geographic region identifier H2K 2W5 in the memory element 158 of the memory 157 of customer premises receiver 150.

In a fifth specific non-limiting embodiment, shown in FIG. 4E, customer premises receiver 150 comprises a Bluetooth or other local wireless transceiver (such as RFID) and an associated processing module. Authorized geographic region identifier H2K 2W5 is provided to a user device 450 that has a complementary local wireless transceiver. A non-limiting example of such a user device is a communication device such as cellular phone, smart phone or personal digital assistant (PDA), each of which also has a connection to a service provider network. Thus, in the present embodiment, authorized geographic region identifier H2K 2W5 is sent to the user device 450 over the service provider network. The user then effects a transfer of received authorized geographic region identifier H2K 2W5 to the processing module via respective local wireless (e.g., Bluetooth™) transceivers of the user device 450 and customer premises receiver 150. The processing module can then store authorized geographic region identifier H2K 2W5 in the memory element 158 of the memory 157 of customer premises receiver 150.

Figure 4F:
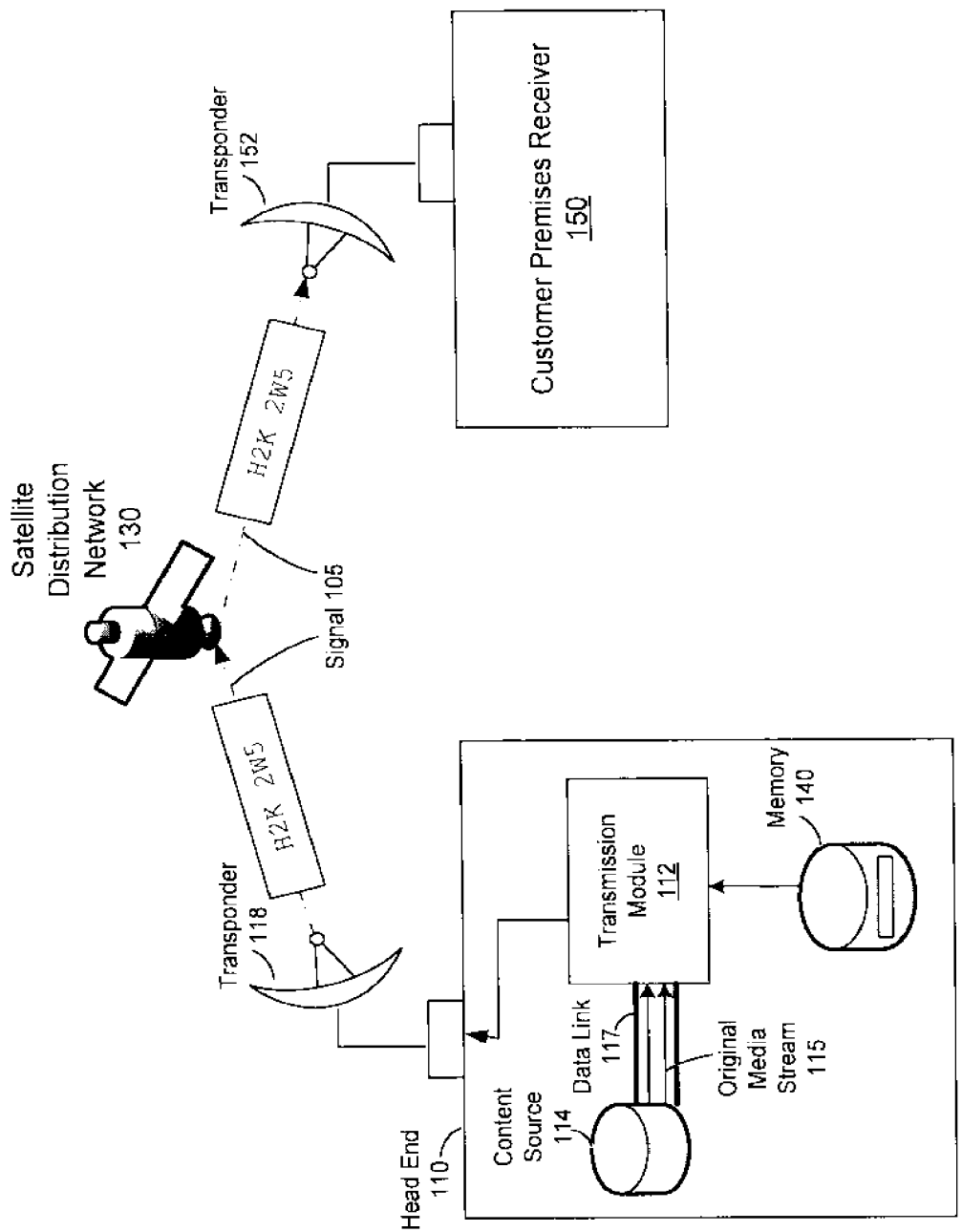

In a sixth specific non-limiting embodiment, shown in FIG. 4F, the authorized geographic region identifier H2K 2W5 can be encoded in an auxiliary media stream that accompanies the original media stream 115 that is modulated and then up-converted to produce the signal 105. Where it is expected that the signal 105 will be broadcast to many users, many authorized geographic region identifiers will need to be sent, and therefore in order to allow each customer premises receiver to know which authorized geographic region identifier is destined for it, it may be beneficial to include an "address" in association with each authorized geographic region identifier. The address may take the form of a serial number, MAC address or other information uniquely associated with, and known to, each individual customer premises receiver. In such a scenario, the receiving module 154 may comprise an additional processing entity (not shown) that is configured to recognize the presence of an auxiliary media stream and furthermore to recognize the address of customer premises receiver 150 appearing in such an auxiliary media stream, and then to identify the accompanying information, namely authorized geographic region identifier H2K 2W5. The additional processing entity can then store authorized geographic region identifier H2K 2W5 in the memory element 158 of the memory 157 of customer premises receiver 150.

In operation, the location comparing module 330 in customer premises receiver 150 carries out a process that is now described with reference to the flowcharts FIG. 5A and FIG. 5B. One assumption that has been made to facilitate an understanding of the present invention is that the signal 105 is received intact. However, this need not be the case, and for example the receiving module 154 (or some other component of customer premises receiver 150) may implement various error correction techniques in order to correct errors that may have occurred during transmission of the signal 105 via the satellite distribution network 130.

Figure 5A:
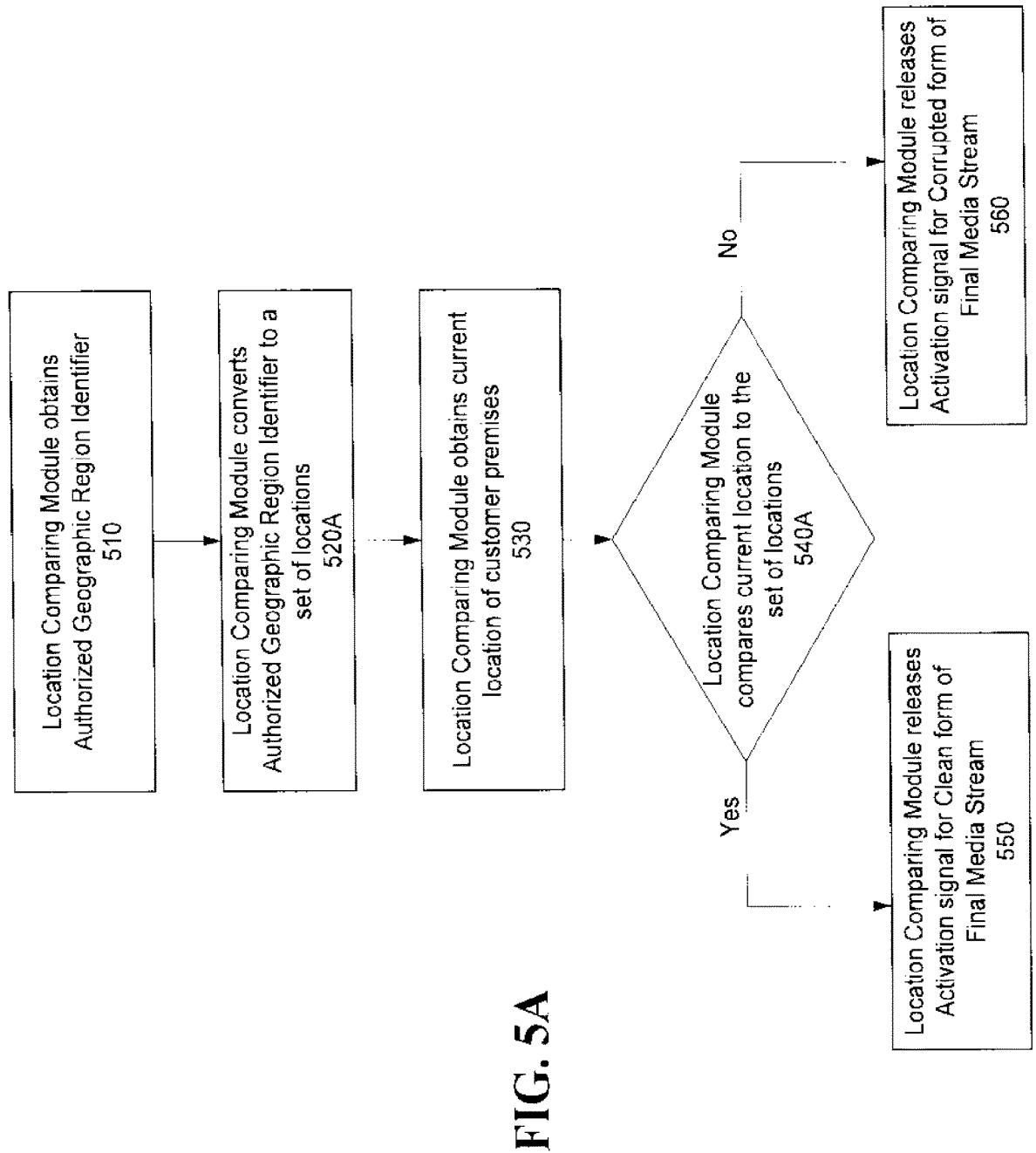
FIGS. 5A and 5B are flowcharts illustrating steps that can be performed by a location comparing module in the customer premises receiver so as to control the conveyance of media to a user, based on whether the customer premises receiver is within or outside its authorized geographic region, in accordance with a specific non-limiting embodiment of the present invention.
Figure 5B:
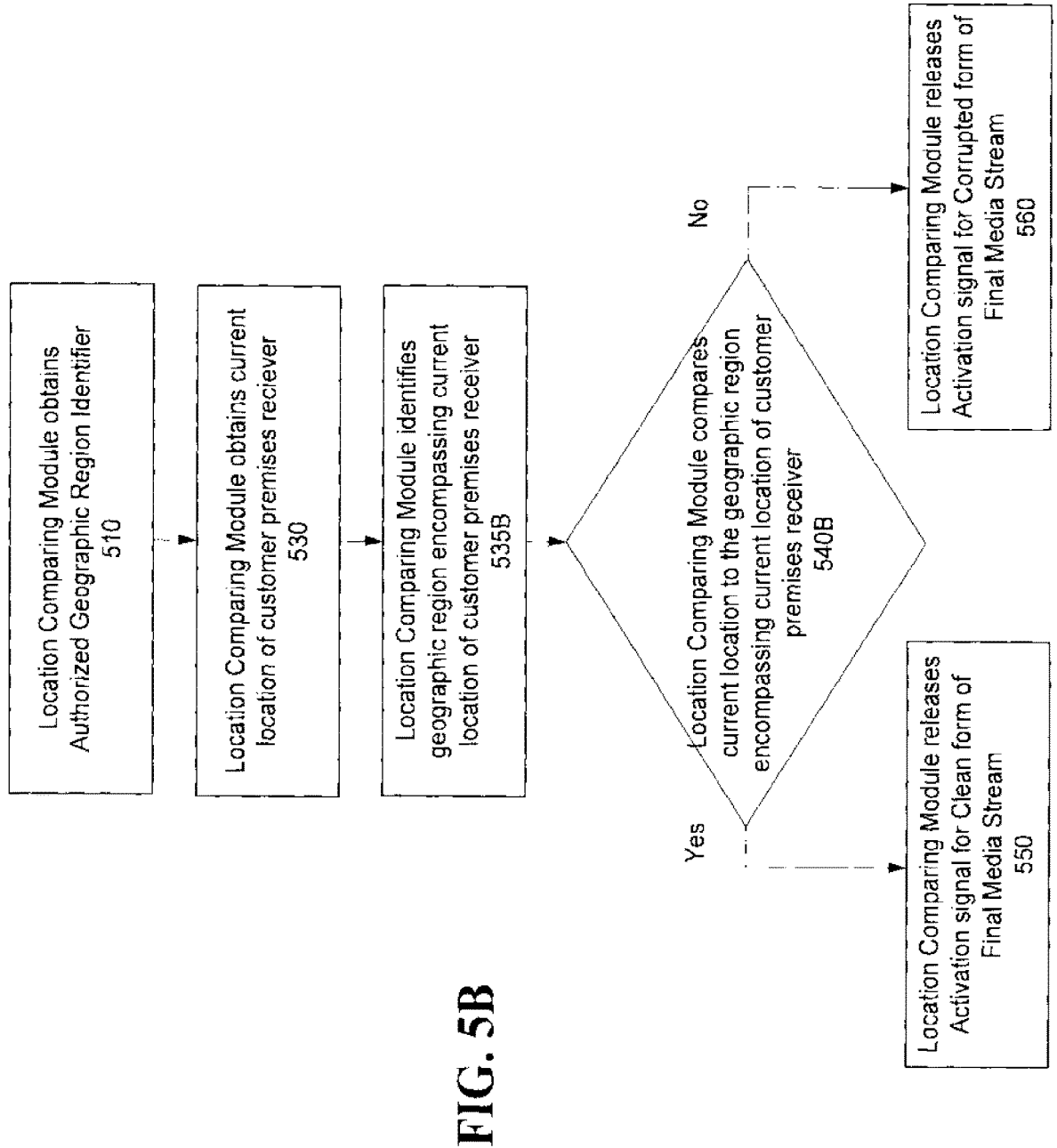

Turning now to the flowchart in FIG. 5A, at step 510, the location comparing module 330 obtains the authorized geographic region identifier of customer premises receiver 150 from the memory element 158. At step 520A, the authorized geographic region identifier of customer premises receiver 150 is converted into a set of locations {LOC} by the location comparing module 330. For example, this can be achieved by consulting a mapping in the memory 157 of customer premises receiver 150, wherein the mapping associates various authorized geographic region identifiers (such as postal codes) with corresponding sets of locations. Alternatively, where the authorized geographic region identifier of customer premises receiver 150 is expressed as a rectangular, circular or elliptical area with an interior point having a specified latitude/longitude and a specified distance branching out from the interior point in each of several directions, the set of locations {LOC} may be created by simply adding the appropriate distance to the latitude or longitude of the interior point.

At step 530, the location comparing module 330 obtains the current location of customer premises receiver 150 from the location determination module 156. The current location of customer premises receiver 150 can be expressed as a point having a specified latitude/longitude. At step 540A, the location comparing module 330 determines whether the current location of customer premises receiver 150 is encompassed by the set of locations {LOC}. If the answer is yes, the location comparing module 330 proceeds to step 550, whereby the activation signal 335 released via the output from the location comparing module 330 causes conveyance to the user of the final media stream 159 in its clean form, by virtue of which the final media stream 159 matches the original media stream 115. If the answer is no, the location comparing module 330 proceeds to step 560, whereby the activation signal 335 released via the output from the location comparing module 330 causes conveyance to the user of the final media stream 159 in its corrupted form, by virtue of which the final media stream 159 is sufficiently corrupted relative to the original media stream 115 as to degrade a user's viewing experience while being demonstrative of the non-malfunctioning of customer premises receiver 150.

In an alternative embodiment, now described with reference to the flowchart in FIG. 5B, at step 510, the location comparing module 330 again obtains the authorized geographic region identifier of customer premises receiver 150 from the memory element 158. At step 530, the location comparing module 330 obtains the current location of customer premises receiver 150 from the location determination module 156. The current location of customer premises receiver 150 can be expressed as a point having a specified latitude/longitude. At step 535B, the location determining module 156 identifies a geographic region encompassing the current location of customer premises receiver 150. For example, this can be achieved by consulting a mapping in the memory 157 of customer premises receiver 150, wherein the mapping associates various geographic regions (e.g., represented by postal codes or other identifiers) with corresponding sets of locations and identifying the geographic region whose corresponding set of locations encompasses the current location of customer premises receiver 150.

At step 540B, the location comparing module 330 determines whether the identifier of the geographic region encompassing the current location of customer premises receiver 150 matches the authorized geographic region identifier. If the answer is yes, the location comparing module 330 proceeds to step 550, whereby the activation signal 335 released via the output from the location comparing module 330 causes conveyance to the user of the final media stream 159 in its clean form, by virtue of which the final media stream 159 matches the original media stream 115. If the answer is no, the location comparing module 330 proceeds to step 560, whereby the activation signal 335 released via the output from the location comparing module 330 causes conveyance to the user of the final media stream 159 in its corrupted form, by virtue of which the final media stream 159 is sufficiently corrupted relative to the original media stream 115 as to degrade a user's viewing experience while being demonstrative of the non-malfunctioning of customer premises receiver 150.

It is recalled that in order for the final media stream 159 to take on its clean form, the actions of the receiving module 154 at step 550 (in either FIG. 5A or FIG. 5B) depend on whether or not the corruption module 280 was used in the transmission module 112. In particular, if the corruption module 280 was used in the transmission module 112, then the correction module 380 is activated in the receiving module 154 so that the corruption induced at the head end 110 is cancelled by customer premises receiver 150. In this way, the final media stream 159 matches the original media stream 115.

On the other hand, in order for the final media stream 159 to take on its corrupted form, the actions of the receiving module 154 at step 560 (in either FIG. 5A or FIG. 5B) may depend on whether or not the corruption module 280 was used in the transmission module 112. In particular, if the corruption module 280 was used in the transmission module 112, then by not activating the correction module 380 at the receiving module 154, the final media stream 159 will remain corrupted and will therefore include the analog and/or digital watermarks (or other artifacts) added by the transmission module 112 previously.

Figure 6:
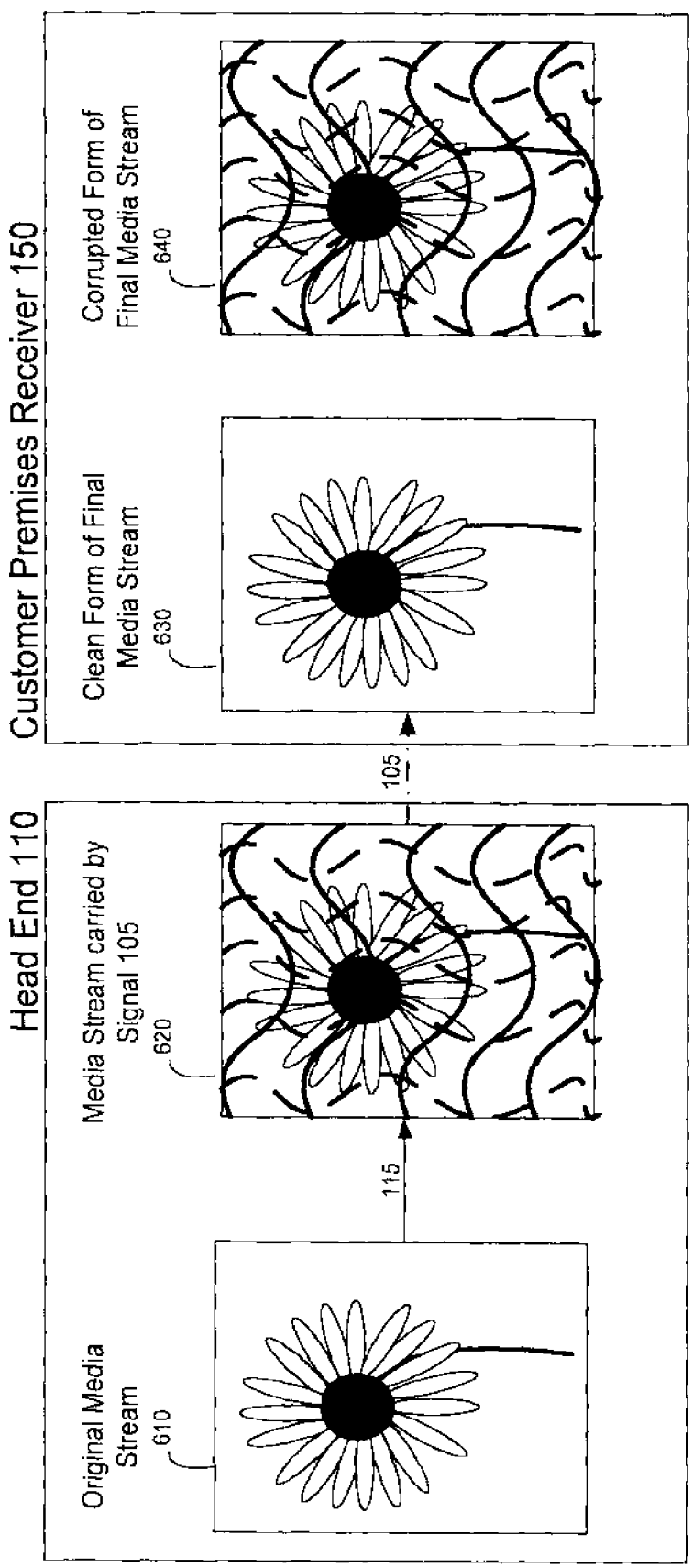
FIG. 6 shows how what is conveyed to the user differs depending on whether the customer premises receiver is within or outside its authorized geographic region, in an example scenario where corruption is induced at the head end.

This process is illustrated in FIG. 6, which shows the result of the activation (or inactivity) of the correction module 380 of customer premises receiver 150 for a representative image of a flower taken from the original media stream 115. Image 610 shows the representative image of the flower as it appears in the original media stream 115, while image 620 shows the representative image with watermarks (in this case, a series of waves) applied by the transmission module 112 prior to transmission in the signal 105 to customer premises receiver 150.

Images 630 and 640 show the results of the location comparing module 330 on the final media stream 159, which in this case includes the flower image. In particular, image 630 shows the image of the flower in the clean form of the final media stream 159, where the location comparing module 330 has identified that customer premises receiver 150 is indeed within the authorized geographic region. Conversely, image 640 shows the image of the flower in the corrupted form of the final media stream 159, where the location comparing module 330 has identified that customer premises receiver 150 is indeed outside of the authorized geographic region.

As shown in FIG. 6, the watermarks (or other artifacts) can be designed to impair the video (and potentially also the audio) to an extent where the user will not be able to fully enjoy the programming, yet the user will nevertheless not mistake the watermark(s) (or other artifact(s)) for a failure on the part of customer premises receiver 150. To this end, the watermark(s) (and/or other artifact(s)) may include a message that informs or reminds the user that customer premises receiver 150 is currently outside its authorized geographic region and invites the user to contact the service provider to subscribe to a new package or pay a surcharge, etc.

In an alternative embodiment, if the corruption module 280 was not used in the transmission module 112, then the corruption module 390 is activated at the receiving module 154. This allows corruption to be induced into the final media stream 159, which is perceived by the user. In a first example (FIG. 7A), the corruption module 390 is configured to cause one or more analog and/or digital watermark(s) (or other artifact(s)) to appear in the final media stream 159, which can be similar to the watermark(s) (or other artifact(s)) that may be induced by the corruption module 280 at the head end 110. This results in a similarly degraded viewing experience for the user.

Figure 7A:
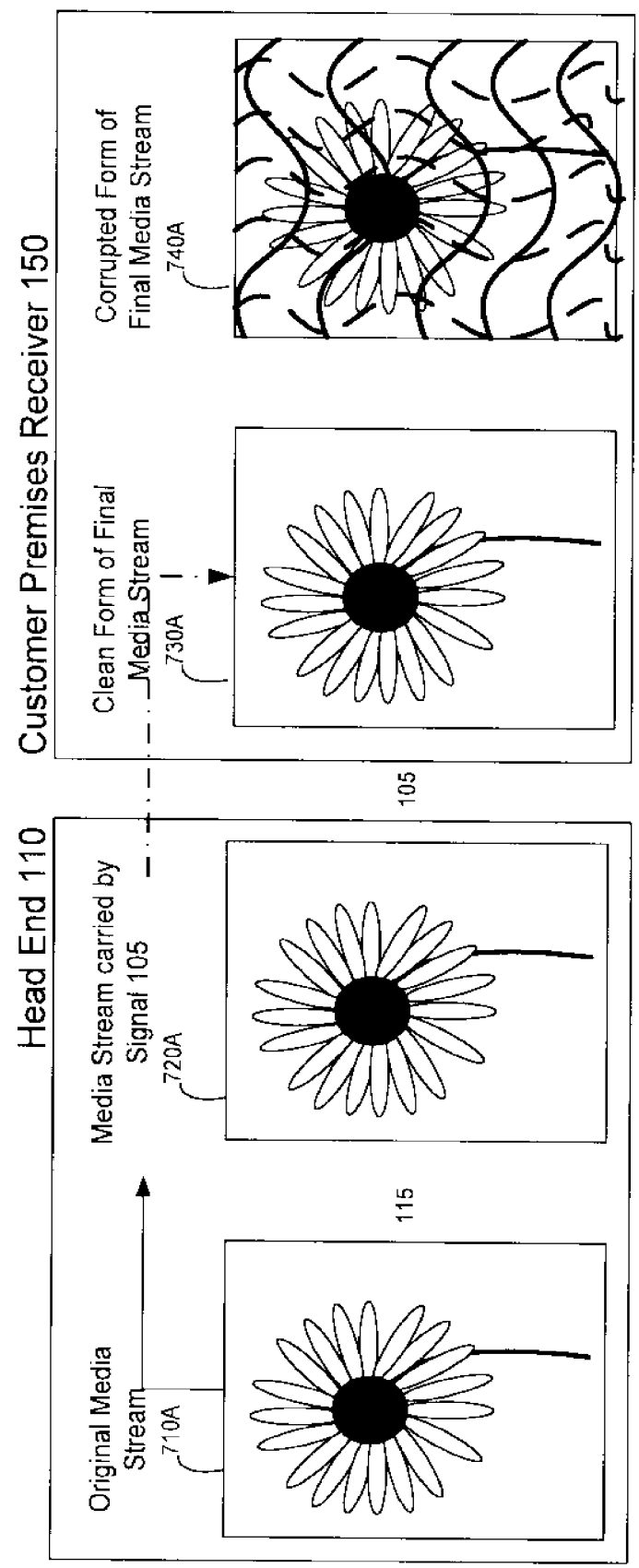
FIGS. 7A and 7B show how what is conveyed to the user differs depending on whether the customer premises receiver is within or outside its authorized geographic region, in two example scenarios where corruption is induced at the customer premises receiver.

The same representative image of the flower used in FIG. 6 is used in the example of FIG. 7A. Images 710A and 710B show the flower image as it is found in the original media stream 115 and as it is transmitted by the transmission module 112 in the signal 105.

Image 730A shows the flower image as it would be seen in the clean form of the final media stream 159. The uncorrupted image appears since the location comparing module 330 was able to identify that the image of the flower in the clean form of the final media stream 159, where the location comparing module 330 has confirmed that customer premises receiver 150 is indeed within the authorized geographic region, thus negating the need to activate the corruption module 390.

In contrast, image 740A shows the flower image as it would be seen in the corrupted form of the final media stream 159, which is due to the location comparing module 330 not identifying that customer premises receiver 150 is within the authorized geographic region. As a result, the location receiving module 330 sends the activation signal 335 to activate the corruption module 390 and so degrade the image for the user.

In a second example (FIG. 7B), the corruption module 390 is configured to display a message that supplants the original media stream 115 and so prevents the user from enjoying any programming whatsoever, yet still the user is not led to conclude that customer premises receiver 150 is malfunctioning, since the message itself can indicate that customer premises receiver 150 is outside its authorized geographic region and invites the user to contact the service provider to subscribe to a new package or pay a surcharge, etc. This is illustrated in image 740B, which differs from image 740A in that the image of the flower has been replaced with an on-screen notice that customer premises receiver 150 is outside of its authorized geographic region.

Of course, a combined approach is possible, whereby a first corruption induced by the corruption module 280 at the head end 110 is removed by the correction module 380 in the receiving module 154, and then a second corruption is added by the corruption module 390 in the receiving module 154. Here, as long as it can be compensated for, the first corruption is not limited in severity, and may in fact be so severe as to appear as a malfunction of customer premises receiver 150 if it were to be perceived by the user. However, the first corruption is removed and effectively replaced with the second corruption which, in accordance with a specific non-limiting embodiment of the present invention, is designed so as to allow the user to conclude that customer premises receiver 150 is not malfunctioning, despite the inferior viewing experience.

Figure 7B:
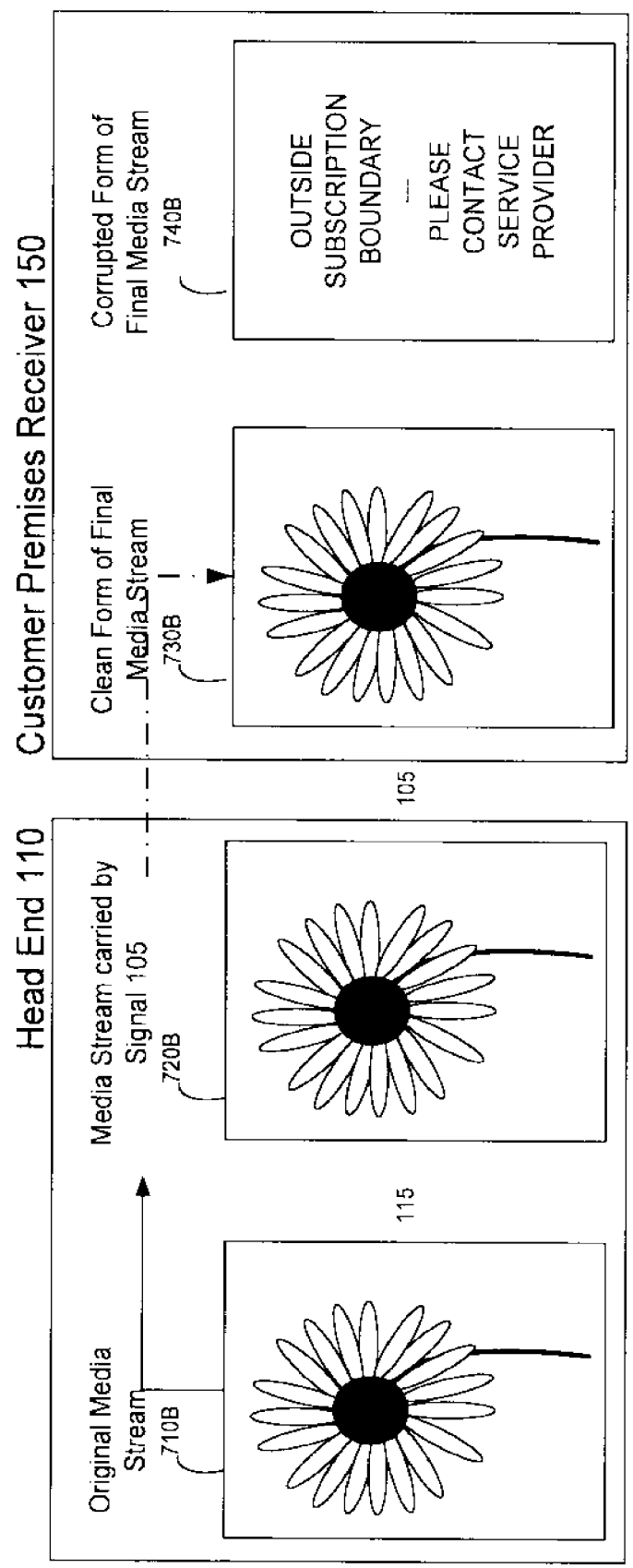
Figure 8:
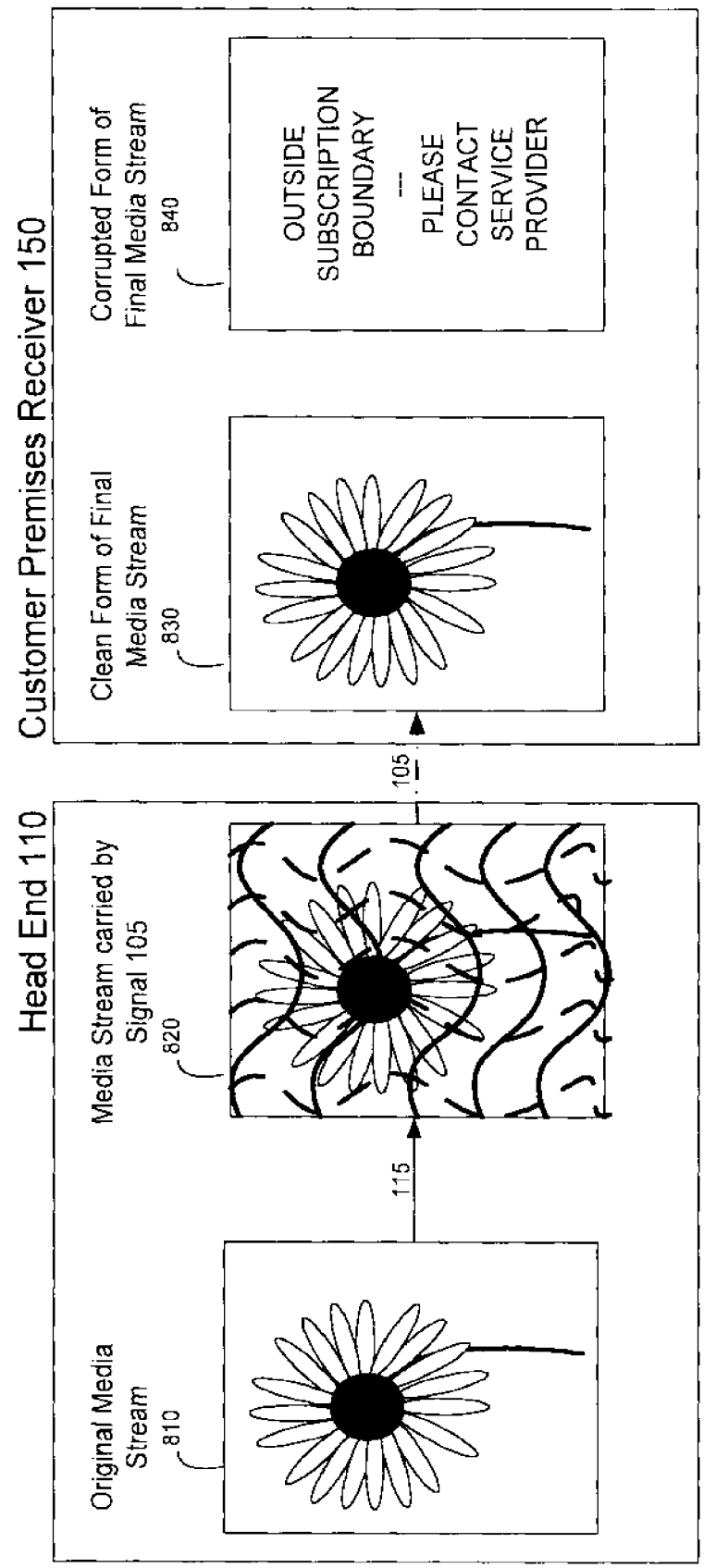
FIG. 8 shows how what is conveyed to the user differs depending on whether the customer premises receiver is within or outside its authorized geographic region, in an example scenario where corruption is induced at the head end and also at the customer premises receiver.

This is shown in FIG. 8, which uses the flower image previously used in FIGS. 6, 7A and 7B to illustrate this approach. Image 810 shows the image of the flower as it is found in the original media stream 115, while image 820 shows the flower image after it has been processed by the transmission module 112 and corruption has been induced by the corruption module 280. The corruption induced into the flower image as it is transmitted via the signal 105 to customer premises receiver 150 is sufficiently severe as to appear as a malfunction of customer premises receiver 150 if it were to be perceived by the user. Such a level of corruption ensures that even if a user were to intercept and decode the satellite signal at this point, the resulting image would be sufficiently degraded as to prevent them from enjoying the programming.

Unlike the approaches illustrated by FIGS. 6, 7A and 7B, however, in the combined approach shown in FIG. 8, the correction module 380 is used to remove the corruption induced by the corruption module 280 regardless of the current location of customer premises receiver 150 relative to its authorized geographic region. If the location comparing module 330 determines that current location of customer premises receiver 150 is within its authorized geographic region, image 830 appears to show that the clean form of the final media stream 159 is being used.

On the other hand, if the location comparing module 330 determines that current location of customer premises receiver 150 is outside of the authorized geographic region, it issues the activation signal 335 to activate the corruption module 390, thus causing the image 840 to appear. Because the corruption in this image (namely, a notification message) would likely be perceived by a user as being less severe than the corruption induced by the corruption module 280 previously, the possibility that a user would conclude that a malfunction of customer premises receiver 150 has occurred is subsequently lessened.

Because the user is not led to conclude that customer premises receiver 150 is malfunctioning, even when customer premises receiver 150 is outside its authorized geographic region, the number of service calls and truck rolls resulting from customer premises receivers being taken out of their respective authorized geographic regions is expected to be reduced. Also, customer annoyance will be reduced because rather than be frustrated with what would otherwise appear as a malfunctioning receiver, the user will be alerted to the fact that the onus lies on the user to make a change to his/her subscription package.

In the non-limiting embodiment presented above, the location determining module 156 that supplied the current location of customer premises receiver 150 to the location comparing module 330 was based on a GPS system, being comprised of the GPS antenna 153 and the GPS receiver 155. Those skilled in the art will of course appreciate that a GPS system is not necessarily the only means by which the location determining module 156 could identify the current location of customer premises receiver 150. In an alternative embodiment, the location determining module 156 could employ a location-determining system that is not based on GPS, such as a triangular positioning system that is based on a terrestrial cellular phone network.

In such an embodiment, the GPS antenna and receiver in the location determining module 156 could be replaced with an antenna and receiver for a terrestrial cellular telephone network and a processing unit. When activated, the antenna and receiver would provide the processing unit would identify at least the closest three (3) cellular base stations and their relative strength. The processing unit can then determine its location by and roughly estimating the distance to the nearest cellular base station, which is likely to be the station with the strongest signal. The processing unit can further refine its location (and therefore, the location of customer premises receiver 150) by interpolating signals between at least two other cellular base stations.

This approach would allow the location determining module 156 to determine the location of customer premises receiver 150 with a precision that is more refined in urban areas (where mobile traffic and density of base stations is sufficiently high) than in rural areas. This is consistent with the embodiments where the size of the various authorized geographic regions is a function of population density. Moreover, using an approach based on cellular base stations may allow customer premises device 150 to establish its current location under conditions that would otherwise not be conducive to the use of GPS, such as a concrete building with thick walls.

Of course, the location determining module 156 could contain both a GPS-based and a non-GPS-based positioning system. Such a configuration would likely allow customer premises receiver 150 to identify its location under a wider variety of conditions and to a greater degree of accuracy and/or precision than would be available if only one type of positioning system were used. In addition, the implementation of two independent positioning systems in customer premises receiver 150 would also provide the location determining module 156 with a certain redundancy against equipment failure.

It should be understood that the term "watermark" as used herein is not intended to be a limiting term but rather an all-encompassing expression that refers to an ancillary signal or message that accompanies or is embedded within a bearer signal. The ancillary signal may cause a change to the bearer signal itself or to the information (e.g., audio, video, etc.) that is conveyed by the bearer signal. In a non-limiting example, the ancillary signal may cause a static or time-varying change (i.e., a modulation) of the frequency or amplitude of the bearer signal, whether such change conveys a particular message or not. In another non-limiting example, the ancillary signal may cause a message (e.g., textual, graphical, audio, etc.) message embedded within the video or audio carried by the bearer signal and ultimately conveyed to the user. Still other manifestations will be apparent to those of ordinary skill in the art as being within the scope of the term "watermark".

It should be further appreciated that a complete satellite (or other) distribution system to allow implementation of the present invention is expected to include additional components that have been omitted from the present description for simplicity, but would be known to those of skill in the art.

While specific embodiments of the present invention have been described and illustrated, it will be apparent to those skilled in the art that numerous modifications and variations can be made without departing from the scope of the invention as defined in the appended claims.

Those skilled in the art will appreciate that in some embodiments, various described entities may be implemented using one or more computing apparatuses that have access to a code memory (not shown) which stores computer-readable program code (instructions) for operation of the one or more computing apparatuses. The computer-readable program code could be stored on a medium which is fixed, tangible and readable directly by the one or more computing apparatuses, (e.g., removable diskette, CD-ROM, ROM, fixed disk, USB drive), or the computer-readable program code could be stored remotely but transmittable to the one or more computing apparatuses via a modem or other interface device (e.g., a communications adapter) connected to a network (including, without limitation, the Internet) over a transmission medium, which may be either a non-wireless medium (e.g., optical or analog communications lines) or a wireless medium (e.g., microwave, infrared or other transmission schemes) or a combination thereof. In other embodiments, various described entities may be implemented using pre-programmed hardware or firmware elements (e.g., application specific integrated circuits (ASICs), electrically erasable programmable read-only memories (EEPROMs), flash memory, etc.), or other related components

What is claimed is:

1. A method, comprising:
respectively releasing, from a head end towards each of a plurality of receivers, an authorized geographic region identifier associated with the respective receiver, the authorized geographic region identifier comprising information regarding a respective geographic region within which the receiver is authorized to output original media streams for conveyance to a user of the receiver, wherein geographic regions in which different ones of the plurality of receivers are authorized to operate define coverage areas of different sizes;
receiving an original media stream at the head end;
generating, at the head end, a corrupted media signal by impairing one or both of a media signal comprising the original media stream, or the original media stream, with a removable artifact configured to be removed by respective receivers if a location of the respective receiver is within the authorized geographic region; and
releasing, from the head end towards the plurality of receivers, the corrupted media signal,
wherein the plurality of receivers are authorized to output the original media stream for conveyance to users of the receivers if a current location of a respective receiver corresponds to the respective geographic region indicated by the authorized geographic region identifier associated with the respective receiver, and wherein different ones of the plurality of receivers are authorized to output the original media stream independent of being associated with different authorized geographic region identifiers.

2. The method defined in claim 1, wherein said geographic regions are inhabited, and wherein the coverage area defined by a first of said regions is related to the coverage area defined by a second of said regions inversely to the manner in which a population density of the first of said regions is related to a population density of the second of said regions.

3. The method defined in claim 1, wherein the information regarding each geographic region comprises at least one of a zip code and a postal code associated with said geographic region.

4. The method defined in claim 3, wherein the at least one of the zip code and the postal code associated with each geographic region is equivalent to the zip code or postal code registered to a respective customer of the service provider.

5. The method defined in claim 1, wherein each of the geographic regions is substantially circular and is defined by a respective unique center and corresponding radius.

6. The method defined in claim 1, wherein for a particular receiver, said releasing comprises shipping the particular receiver to a particular customer of said service provider at a particular address within the geographic region within which the particular customer premises receiver is authorized to output original media streams for conveyance to a user of the particular receiver.

7. The method defined in claim 6, wherein said particular address is within at least one of a particular zip code and a particular postal code and wherein the information regarding the geographic region within which the particular receiver is authorized to output original media streams for conveyance to the user of the particular receiver comprises at least one of said particular zip code and said particular postal code.

8. The method defined in claim 6, further comprising embedding said information regarding the geographic region within which the particular receiver is authorized to output original media streams for conveyance to the user of the particular receiver in a memory of the particular receiver prior to said shipping.

9. The method defined in claim 1, wherein for a particular receiver, said releasing comprises (i) embedding the information regarding the geographic region within which the particular receiver is authorized to output original media streams for conveyance to a user of the particular receiver in a peripheral device for insertion into the particular receiver and (ii) shipping the peripheral device to an address within the geographic region within which the particular receiver is authorized to output original media streams for conveyance to the user of the particular receiver.

10. The method defined in claim 9, wherein the peripheral device comprises a smart card.

11. The method defined in claim 1, wherein the signal containing the media stream and the information regarding the geographic region within which each particular receiver is authorized to output original media streams for conveyance to a user are released over a satellite link.

12. The method defined in claim 1, wherein the information regarding the geographic region within which each particular receiver is authorized to output original media streams for conveyance to a user is incorporated into said media signal containing the media stream.

13. The method defined in claim 1, wherein the removable artifact is a removable digital artifact.

14. The method defined in claim 13, wherein the removable digital artifact comprises a watermark.

15. The method defined in claim 13, wherein the removable digital artifact comprises a warning message for display on a screen.

16. The method defined in claim 1, wherein the removable artifact is a removable analog artifact.

17. A non-transitory computer-readable storage medium comprising a set of instructions for execution by a computing device at a head end, wherein execution of the set of instructions by the computing device causes the head end to execute a method comprising:
respectively releasing, from the head end towards each of a plurality of receivers, an authorized geographic region identifier associated with the respective receiver, the authorized geographic region identifier comprising information regarding a respective geographic region within which the receiver is authorized to output original media streams for conveyance to a user of the receiver, wherein geographic regions in which different ones of the plurality of receivers are authorized to operate define coverage areas of different sizes;
receiving an original media stream at the head end;
generating, at the head end, a corrupted media signal by impairing one or both of a media signal comprising the original media stream, or the original media stream, with a removable artifact configured to be removed by respective receivers if a location of the respective receiver is within the authorized geographic region; and
releasing, from the head end towards the plurality of receivers, the corrupted media signal,
wherein the plurality of receivers are authorized to output the original media stream for conveyance to users of the receivers if a current location of a respective receiver corresponds to the respective geographic region indicated by the authorized geographic region identifier associated with the respective receiver, and wherein different ones of the plurality of receivers are authorized to output the original media stream independent of being associated with different authorized geographic region identifiers.

18. The method of claim 1, wherein the authorized geographic region identifiers are encoded in an auxiliary media stream that accompanies the corrupted media signal, and wherein each of the respective authorized geographic location identifiers are associated with an address indicative of a particular receiver that the respective authorized geographic location identifier is associated with.

19. The method of claim 1, wherein the authorized geographic region identifiers are provided to users of the respective receivers, and the users input the authorized geographic region identifiers into an input device coupled with the respective receivers.

20. A head end for distributing media to a plurality of receivers, comprising:
a memory storing a plurality of receiver identifiers in association with respective authorized geographic region identifiers, the receiver identifiers identifying individual receivers, the authorized geographic region identifiers defining respective coverage areas of different sizes in which the respective receivers are authorized to output original media streams for conveyance to a user; and
a processing entity configured to:
consult said memory based on a particular one of the receiver identifiers in order to identify a particular one of said authorized geographic region identifiers that is associated with said particular one of the receiver identifiers;

release toward a particular receiver identified by the particular one of the receiver identifiers the particular one of said authorized geographic region identifiers;

receive an original media stream;

generate a corrupted media signal by impairing one or both of a media signal comprising the original media stream, or the original media stream, with a removable artifact configured to be removed by the individual receivers if a location of a respective receiver is within the authorized geographic region indicated by the authorized geographic region identifier associated with the respective receiver; and release towards the individual receivers the corrupted media signal, wherein the individual receivers are authorized to output the original media stream for conveyance to users of the receivers if a current location of a respective receiver corresponds to the respective geographic region indicated by the authorized geographic region identifier associated with the respective receiver, and wherein different ones of the individual receivers are authorized to output the original media stream independent of being associated with different authorized geographic region identifiers.

* * * * *